April 7, 1953 E. KOERBER 2,633,820
PAN GREASER
Filed June 1, 1950 5 Sheets-Sheet 3

INVENTOR.
Ernest Koerber
BY
Marry, Brown and Hausmann
ATTYs.

April 7, 1953 E. KOERBER 2,633,820
PAN GREASER

Filed June 1, 1950 5 Sheets-Sheet 4

INVENTOR.
Ernest Koerber
BY
Mann, Brown & Hansmann
Atty.

April 7, 1953 E. KOERBER 2,633,820
PAN GREASER
Filed June 1, 1950 5 Sheets-Sheet 5

INVENTOR.
Ernest Koerber
BY
Mann, Brown & Hansmann
Attys.

Patented Apr. 7, 1953

2,633,820

UNITED STATES PATENT OFFICE 2,633,820

PAN GREASER

Ernest Koerber, Chicago, Ill.

Application June 1, 1950, Serial No. 165,572

3 Claims. (Cl. 118—2)

This invention relates to bakers' machinery, and has for its principal object to provide an automatic pan greaser for use with a pan return conveying system whereby each pan will reach the panner in condition to receive dough.

Further objects and advantages of the invention will appear as the disclosure proceeds.

Figure 1:
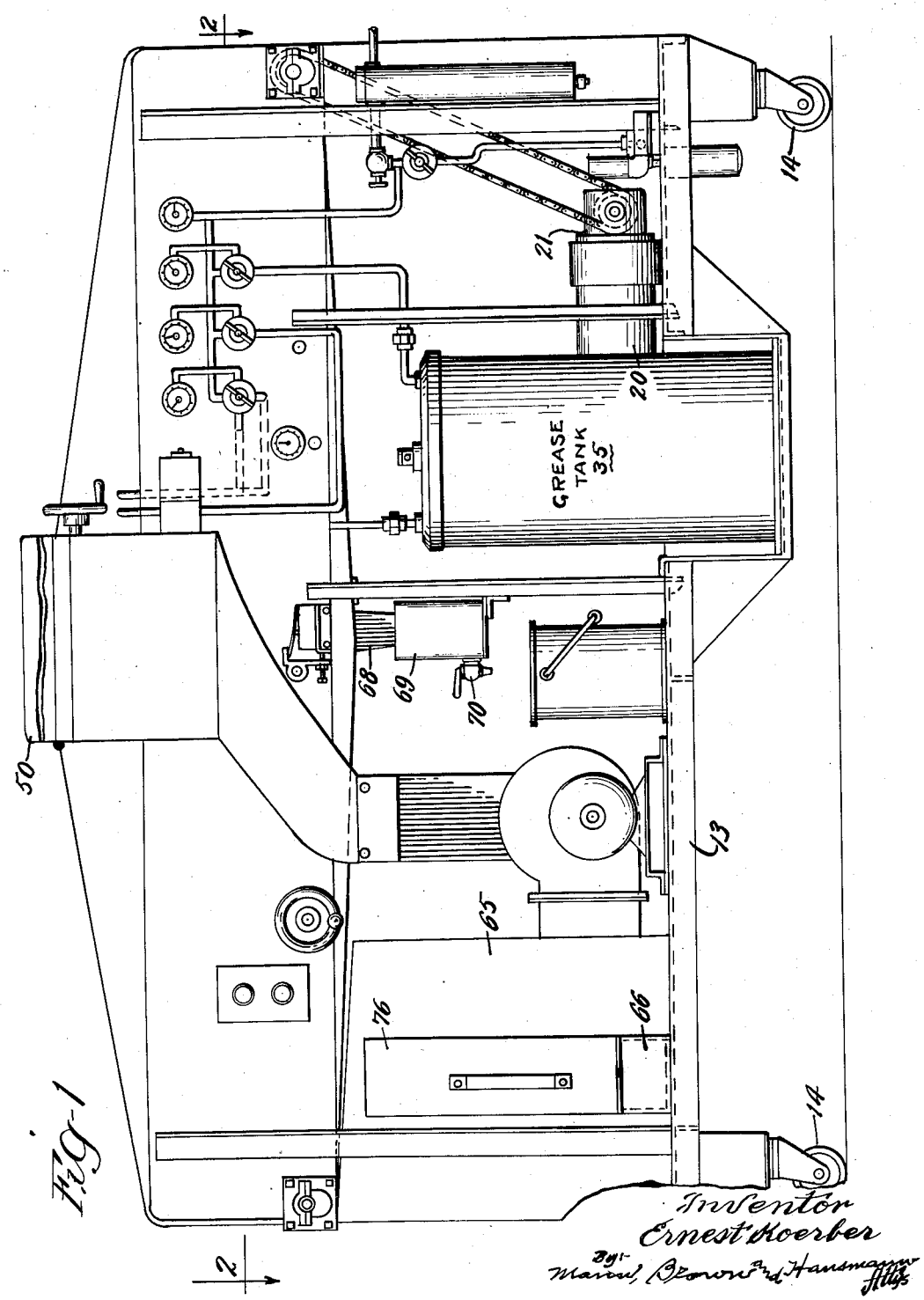
Fig. 1 is a side elevation of a set of apparatus on a portable frame.
Figure 2:
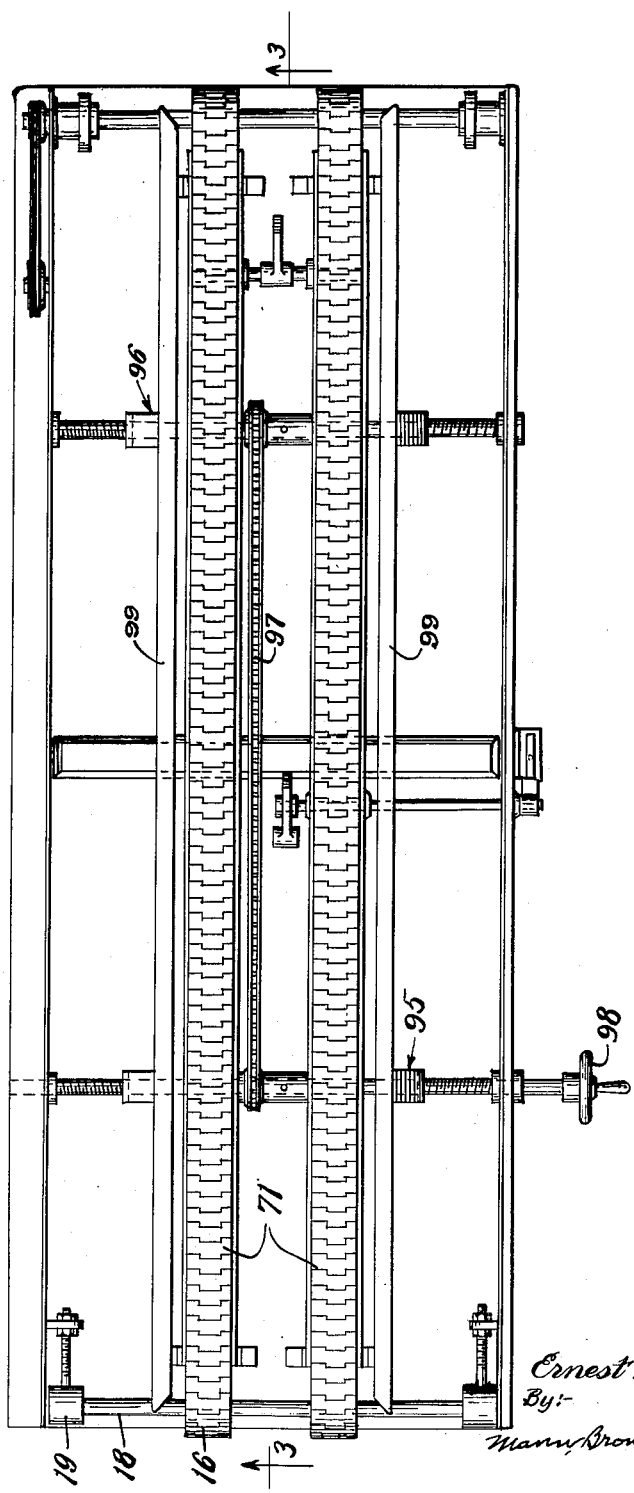
Fig. 2 is a plan section taken on the line 2—2 of Fig. 1.

This invention is intended for use in bakery equipment including a mixer, a divider, a proofer, a panner, an oven, a cooler, a depanner, etc.

Customarily, such a system is provided with dough and bread containers commonly termed pan sets 10 (Fig. 4), since each includes a plurality of pans 11 secured together by a frame 12 to form a unit or set.

As here shown, the pan greasing apparatus is on a frame generally indicated by 13 and mounted on casters 14 to be portable.

Running lengthwise through the frame is a conveyor generally indicated by 15 including belts or chains 16 running over sprockets 17 on shafts 18 journalled in bearings 19, and one of which is driven from an electric motor 20 and reducing gear 21.

Figures 3, 4:
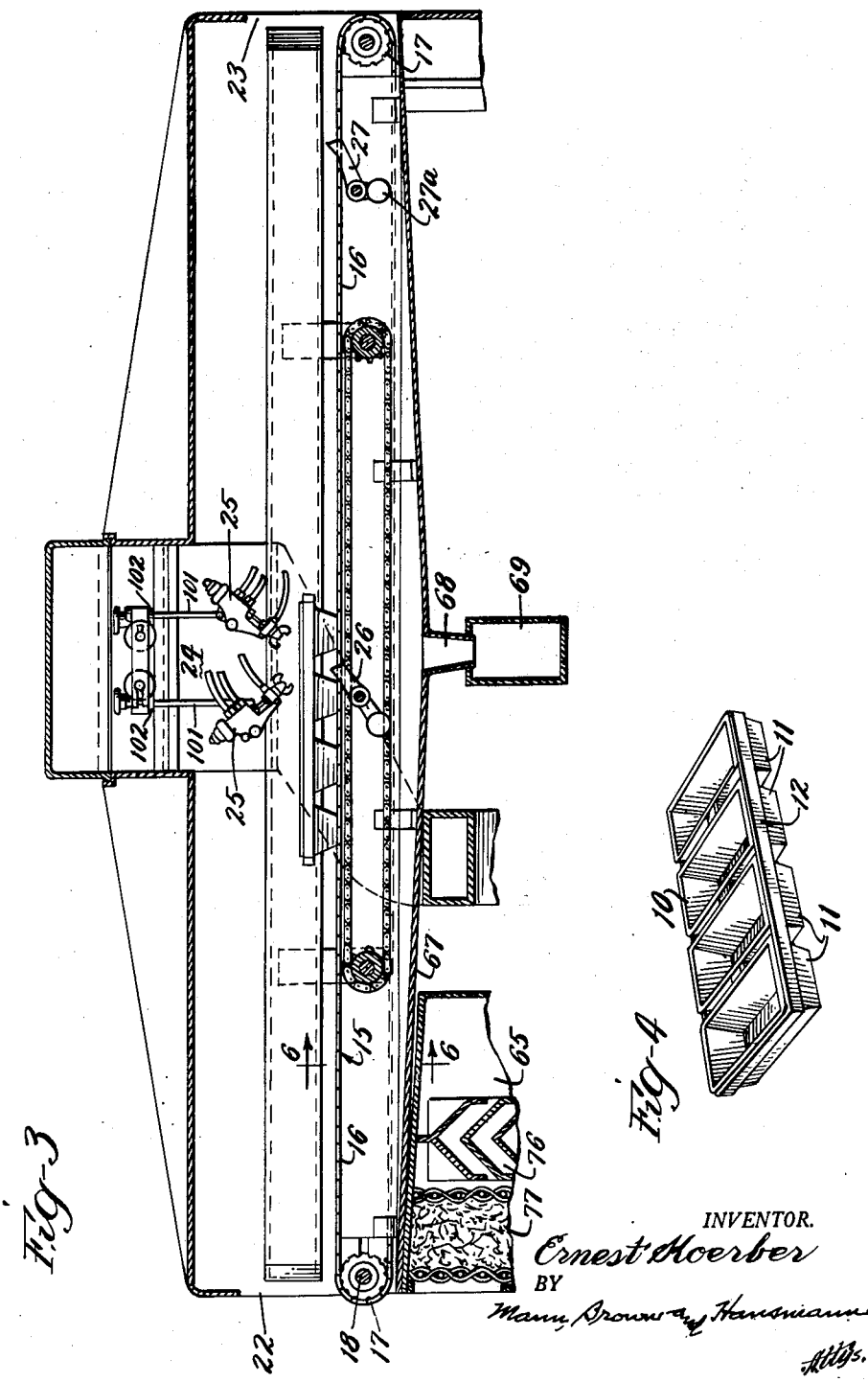
Fig. 3 is a vertical section taken on the line 3—3 of Fig. 2.
Fig. 4 is a perspective view of one form of pan set customarily used and suitable for use with apparatus embodying this invention.

The frame work 13 is entirely enclosed by walls except for an entrance 22 at the left in Fig. 3 and an exit 23 at the right convenient to the ends of the conveyor 15. In the use of the apparatus, pan sets 10 travel along the conveyor end to end entering at 22 and leaving at 23.

In the mid-portion of the apparatus, there is what will be called a "greasing station," generally indicated by 24 at or near which are mounted grease guns, such as sprayers or atomizers 25 properly directed toward pans on the conveyor.

The conveyor 15 travels continuously to deliver greased pans to a dough panner (not shown). Pawls 26 and 27 are arranged between the conveyor belts 16, the former adjacent greasing station 24 and the latter near the discharge end of the conveyor 15. The pawl 26 is successively depressed by the pans 11 to effect a recurring timed operation of the grease guns 25. Such operation is effected through a microswitch 32 connected to a solenoid 30 for a pressure relief valve V which is adapted to actuate a microswitch 34 controlling solenoid 33 for a gun valve 31 (see Fig. 8).

The pawl 26 is mounted to turn a rod 28 connected to an arm 29 positioned to depress a spring arm 32-a for a microswitch 32. The pawl 27 is weighted as shown at 27-a (see Fig. 3) and successively contacts the trailing side of each pan 11 to prevent a pan set from being backed up by the conveyor belts in the event the dough panner, for some reason, is not ready to receive a pan set 10 in position to be discharged from the conveyor.

Figure 8:
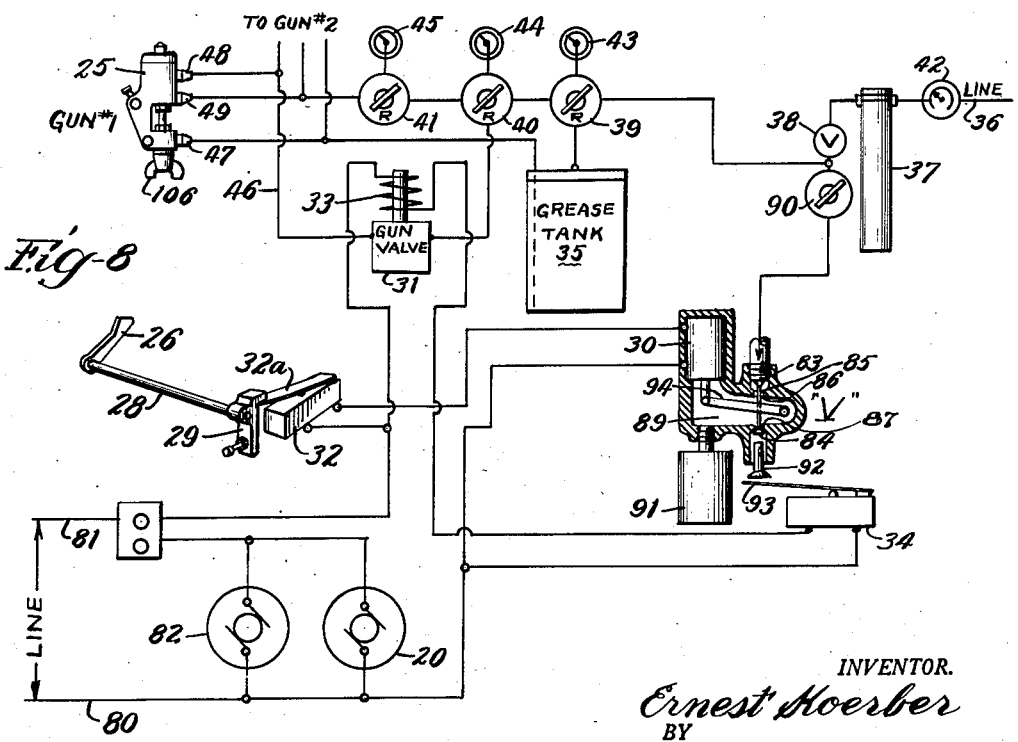
Fig. 8 is a diagram of the air and electrical systems for supplying grease.

The grease supply is stored in a tank 35 (Figs. 1 and 8) associated with an air system including a line 36, a condenser 37, a valve 38, reducing valves 39, 40 and 41 connected with the tank 35, the gun control 31, and the guns 25, as indicated in the diagram Fig. 8, which is deemed sufficient without detailed description.

The system is provided with gauges 42, 43, 44 and 45 to indicate the air pressure in the line 36 on the tank 35, on the guns through the control 31, and on the guns through an auxiliary line 46, there being one inlet for grease 47 to each gun and two inlets 48 and 49 for air.

Figure 7:
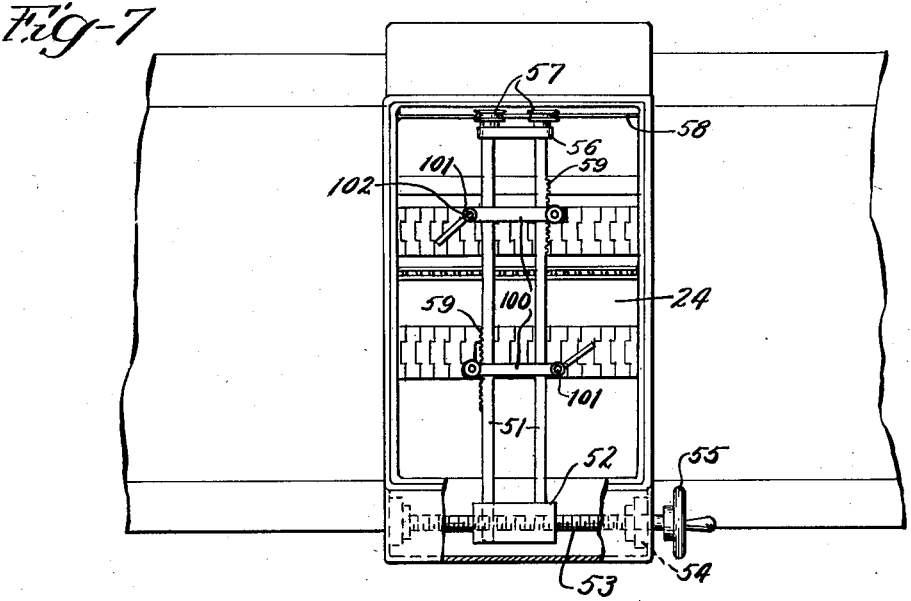
Fig. 7 is a plan view of the intermediate portion of the apparatus with the hinged cover of the hood removed.

The guns are mounted under a hinged cover 50 of a hood on transverse rods 51 (Fig. 7), one end of which is mounted in a block 52 threaded on a shaft 53, journalled in bearings 54, and equipped with a hand wheel 55. The opposite ends of the shaft 51 are in a block 56 and equipped with rollers 57 on a track 58. By means of this mounting, the guns can be adjusted lengthwise with respect to the greasing station.

The guns are movable laterally on the rods 51, and secured in position by racks and pinions 59, 59 to adjust them laterally with respect to the greasing station.

The guns 25 are suspended from beams or blocks 100 (controlled by racks and pinions 59) by threaded rods 101, which permit the guns to be raised or lowered and turned about vertical axes. They are made fast in selected position by nuts 102 (see Fig. 3).

These things make it possible to arrange the guns in suitable position with respect to a variety of sizes of pans and pan sets.

Figure 5:
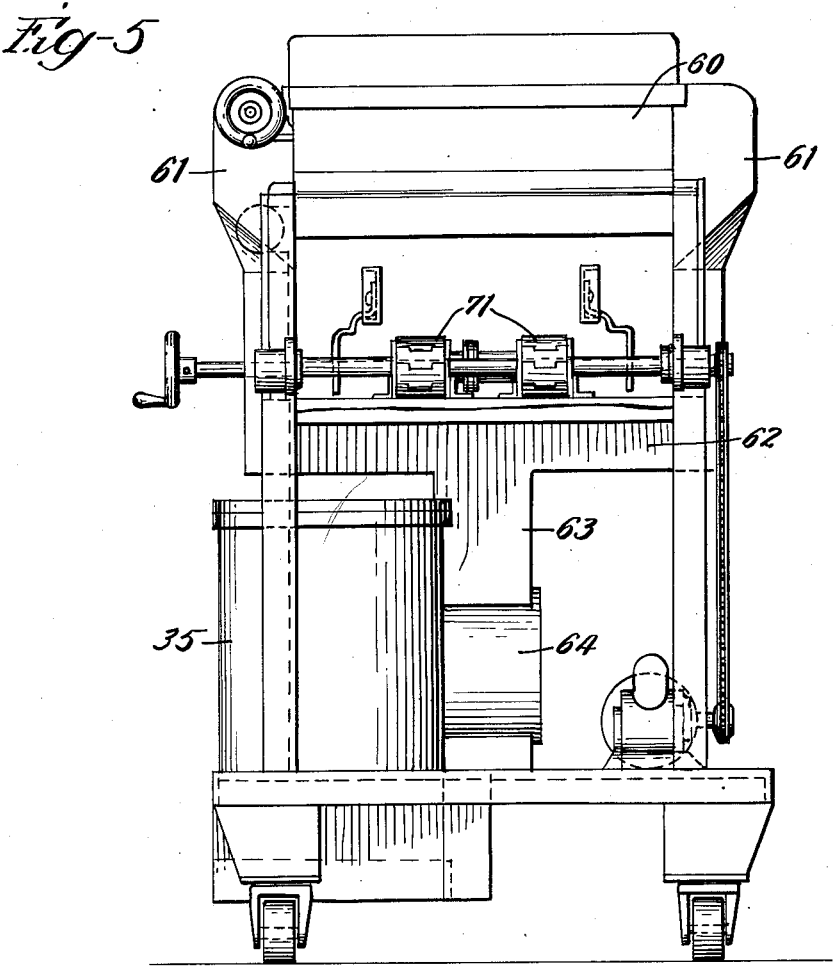
Fig. 5 is an end view looking from the right in Fig. 1.
Figure 6:
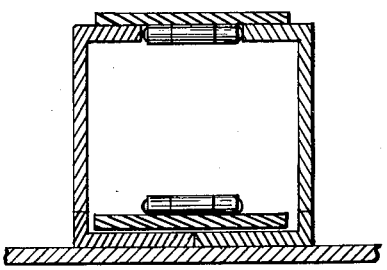
Fig. 6 is a vertical section on the line 6—6 of Fig. 3.

The hood 60 extends crosswise to the enclosure on the frame (Fig. 5) and connects with downturned passages 61 communicating with the transverse conduit 62, which in turn, communicates with the vertical conduit 63 leading to the intake of a blower 64 that delivers through a separator 65 equipped with a grease pan 66. By this means, all fog of grease about the greasing station is captured and taken away from the inside of the apparatus, and the grease is separated from the air.

The separator 65 is formed with a removable baffle 76 and an air filter 77 (see Fig. 3).

Beneath the conveyor 15 is a grease pan 67 (see Fig. 3) inclining toward a delivery spout 68 beneath which there is a collecting tank 69 equipped with a valve 70.

The conveyor belts are preferably made of links 71 of stainless steel or the like, which will not pollute the grease.

In the wiring diagram (see Fig. 8), the line is shown at 80 and 81 connected to the blower motor 82 and the conveyor motor 20, with the solenoid 30 through the microswitch 32 and with the solenoid 33 through the microswitch 34.

The pressure relief valve V (see Fig. 8) is provided with a pair of opposed valve members 83 and 84 connected to a common stem 85 and controlling ports 86 and 87 leading from a chamber 89. The port 83 is connected to the air pressure line 36 through a regulator 90 whereas the port 87 exhausts to the atmosphere. The chamber 89 also communicates with an expansion tank 91. A plunger 92, mounted in the exhaust from the port 87, is positioned to contact a spring arm 93 for the microswitch 34. An arm 94 connects the valve stem 85 with the armature of the solenoid 30.

As a pan 11 moves into greasing position the pawl 26 is depressed, closing the microswitch 32 and energizing the solenoid 30. This shifts the valves 83 and 84 so that the one closes communication from the air line 36 to the chamber 89 and the other opens communication from the chamber 89 to the atmosphere. This shifting of the valve members 83 and 84 permits the air in the expansion tank to effect an instantaneous shifting of the plunger 92 and a holding thereof in its shifted position so as to maintain a timed depression of the switch arm 93 for microswitch 34, whereby the circuit to the gun valve 31, and the grease guns 25, is kept closed a sufficient length of time to effect the desired greasing of a pan 11 of a pan set 10 moving through the grease station 24.

To this end the size of the tank 91, that of the openings leading from the chamber 80 to the tank 91 and through the port 87, and the positioning of the valve 90 may be so formed and arranged as to prolong for a definite period of time the exhaust of air through the port 87 and thereby secure a predetermined period of action for the spray guns 25 sufficient to meet the needs of any particular situation. The arrangement possesses the further advantage that the spraying action of guns 25 is limited to that predetermined period of time fixed by the arrangement of the above-mentioned factors. Thus, if a pan should be stalled on the pawl 26 there will be no more spraying of grease than that required for the pan.

From the foregoing, it will be apparent that the invention provides a pan greasing station, a conveyor for pans, a means for giving the pans constant motion through the pan greasing station, and greasing means for supplying a desired amount of grease to the pans at an appropriate point in the greasing station.

The specific apparatus shown and described to carry out the invention contemplates a constantly driven conveyor with a pawl operated in timed relation to the passing of a pan through the greasing station to so operate the grease gun as to discharge a predetermined amount of grease as the pan is in a position best suited to receive the grease.

The spray guns 25 are preferably provided with discharges or nozzles 106 to spread out the spray or streams of vapor or atomized grease in a way suitable to the area of the pan to be covered. Any excess going beyond the pans is collected by the system and delivered either to the tank 69 or the pan 66.

The unit is entirely enclosed except for the entrance and exit, and is adapted to be kept in sanitary condition at all times.

The disclosure contemplates that the conveyor 15 may be in two sections running from end to end of the apparatus but spaced apart laterally and bordered by laterally extending rails 99 connected with oppositely threaded screw means 95 and 96 between which extend a chain and sprocket means 97 and operated by a hand wheel 98 for shifting the two rails relatively to each other transversely of the conveyor for accommodating pans of differing width.

I claim:

1. In apparatus of the class described, a pan greasing station, conveying means for moving a pan past the station, a grease sprayer adjacent the station, a source of pressure for operating said sprayer, electrically actuated means for controlling said sprayer, a pair of normally-open switches, a solenoid, a circuit operatively connecting said switches and said solenoid with said electrically-actuated means, means controlled by the movement of a pan for closing one of said switches, a pressure chamber connected to said pressure source, means activated by the escape of pressure from said chamber for closing the other said switch, a pair of shiftable valves normally opening communication between said chamber and the source of pressure and closing communication between said chamber and the atmosphere respectively, and means operated by said solenoid for reversing said valves.

2. In apparatus of the class described, a pan greasing station, conveying means for moving a pan past the station, a grease sprayer adjacent the station, a source of pressure for operating said sprayer, electrically actuated means for controlling said sprayer, a pair of normally-open switches, a solenoid, a circuit operatively connecting said switches and said solenoid with said electrically-actuated means, means controlled by the movement of a pan for closing one of said switches, a pressure chamber having opposed ports connecting with said pressure source and with the atmosphere respectively, a yieldingly-mounted arm on said second switch arranged adjacent the latter port, a plunger arranged in said latter chamber port and positioned to engage said switch arm, a pair of simultaneously-shiftable valves controlling said ports and normally positioned to open the former port and close the latter, and means operated by said solenoid for reversing said valves, whereby said plunger is activated by the escaping pressure to momentarily close said second switch.

3. In apparatus of the class described, a pan greasing station, conveying means for moving a pan past the station, a grease sprayer adjacent the station, electrically operated means for controlling said sprayer, a normally open switch connected in series with said electrically operated means, normally inactive pressure means disposed in position relative to said switch for closing said switch for a predetermined period upon actuation whereby said sprayer is operated for a like period, means, including a normally unactuated solenoid, operatively connected to said pressure means for actuating said pressure means upon actuation of said solenoid, another normally open switch connected in series with said solenoid, said solenoid and said other switch being connected in parallel with said electrically operated means and said first mentioned switch, and means controlled by the movement of a pan for closing said other switch.

ERNEST KOERBER.

REFERENCES CITED

The following references are of record in the file of this patent:

UNITED STATES PATENTS

| Number | Name | Date |
|---|---|---|
| 1,741,155 | Hatch | Dec. 31, 1929 |
| 1,862,380 | Larson | June 7, 1932 |
| 1,917,767 | Larson | July 11, 1933 |
| 2,453,527 | Mero | Nov. 9, 1948 |
| 2,499,621 | Archer | Mar. 7, 1950 |
| 2,557,479 | Smith | June 19, 1951 |